May 3, 1927.
H. R. HOCHULI
1,627,093
MACHINE FOR CLEARING MATRIX CAVITIES
Filed Aug. 20, 1924    7 Sheets-Sheet 1
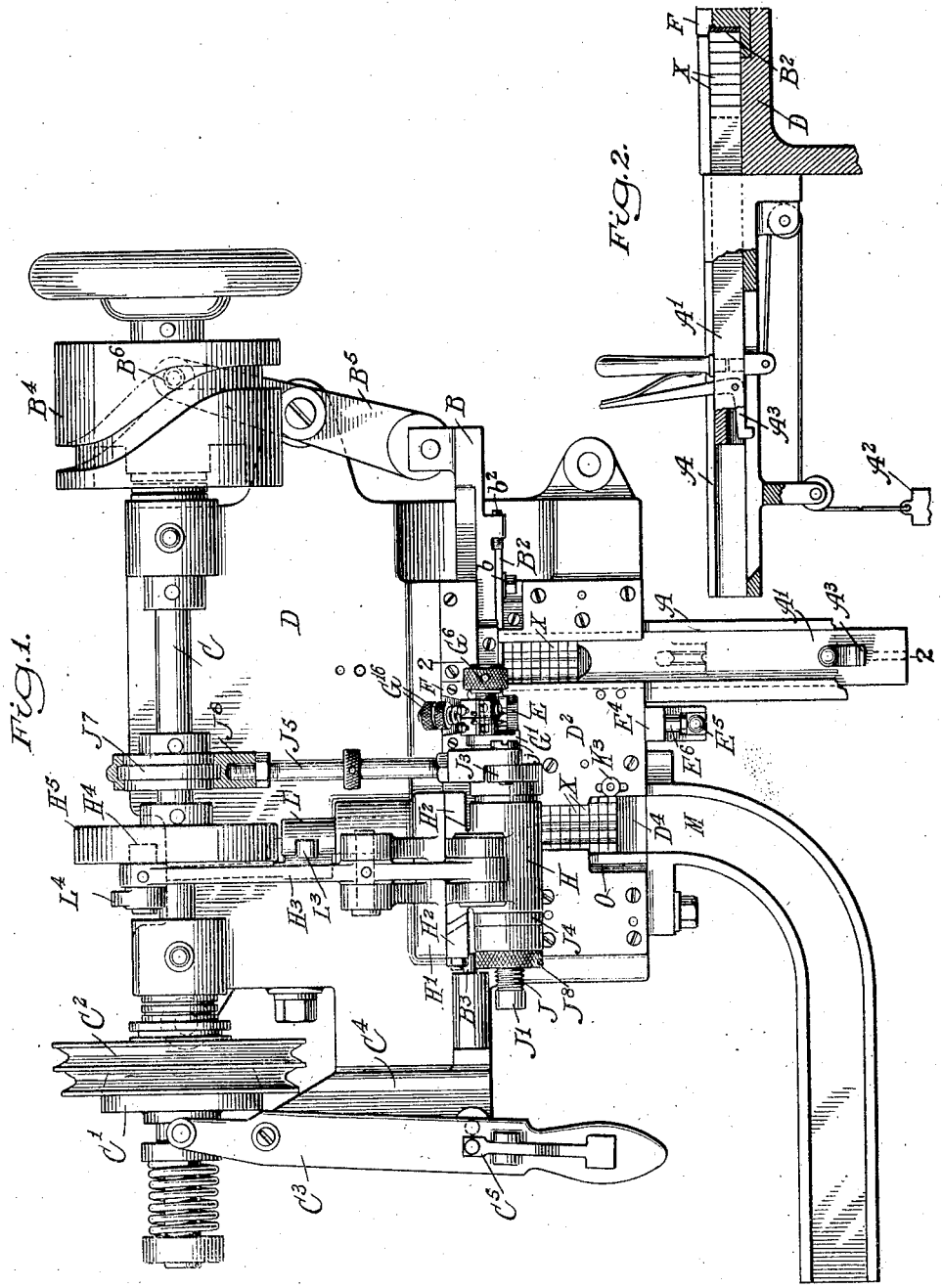
INVENTOR
Henry R. Hochuli
BY
Rogers Kennedy Campbell
ATTORNEYS

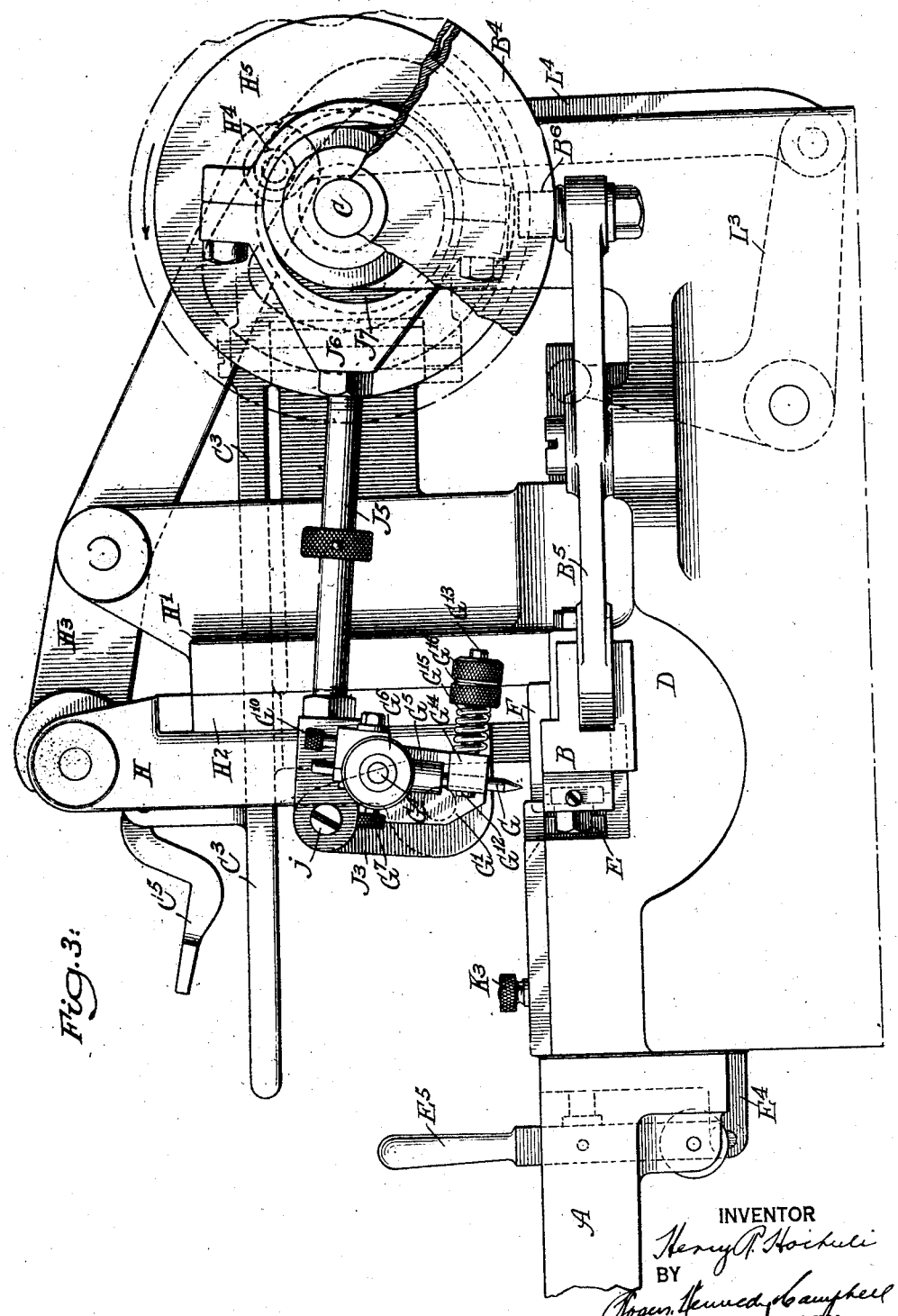

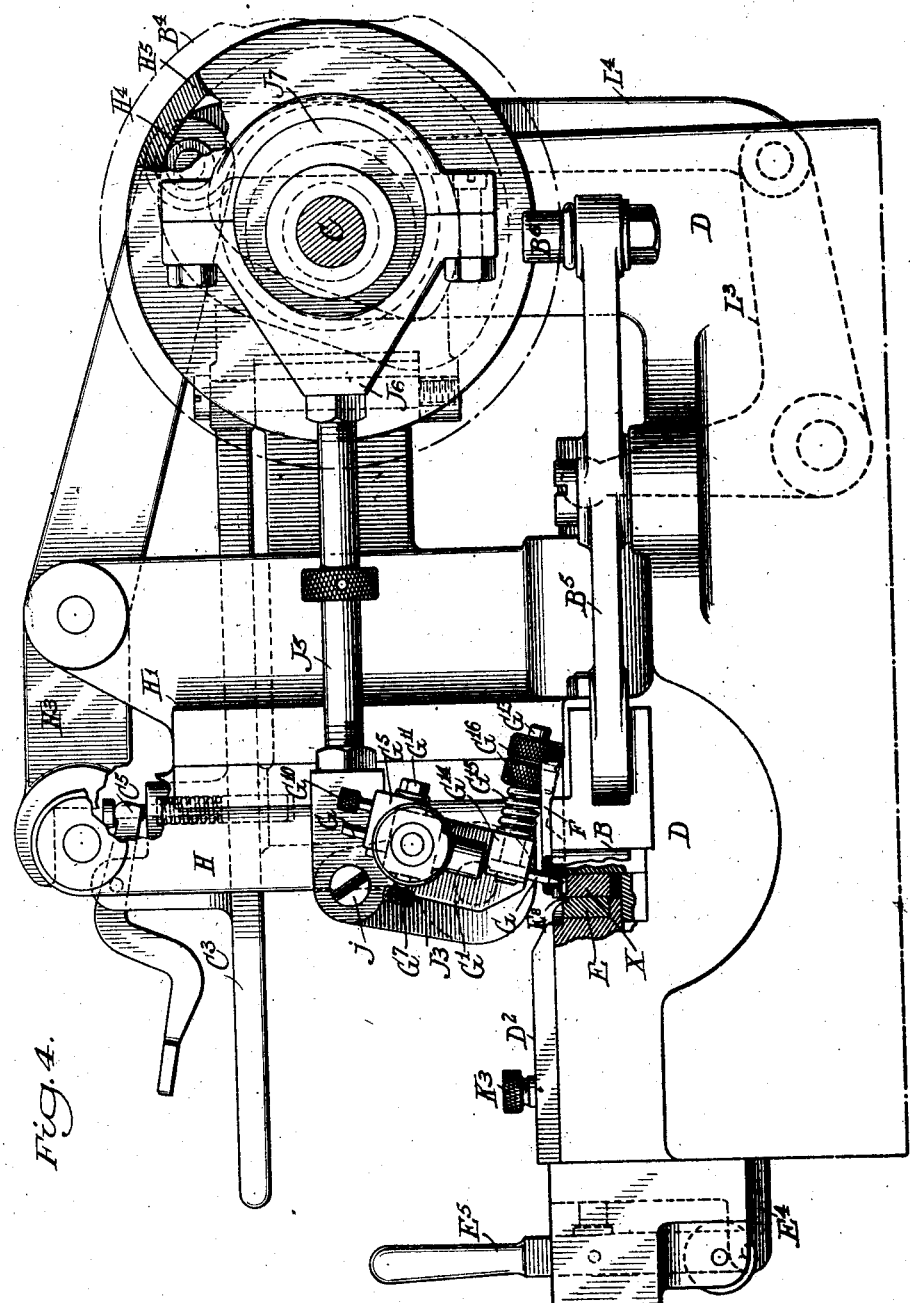

May 3, 1927.
H. R. HOCHULI
1,627,093
MACHINE FOR CLEARING MATRIX CAVITIES
Filed Aug. 20, 1924    7 Sheets-Sheet 4
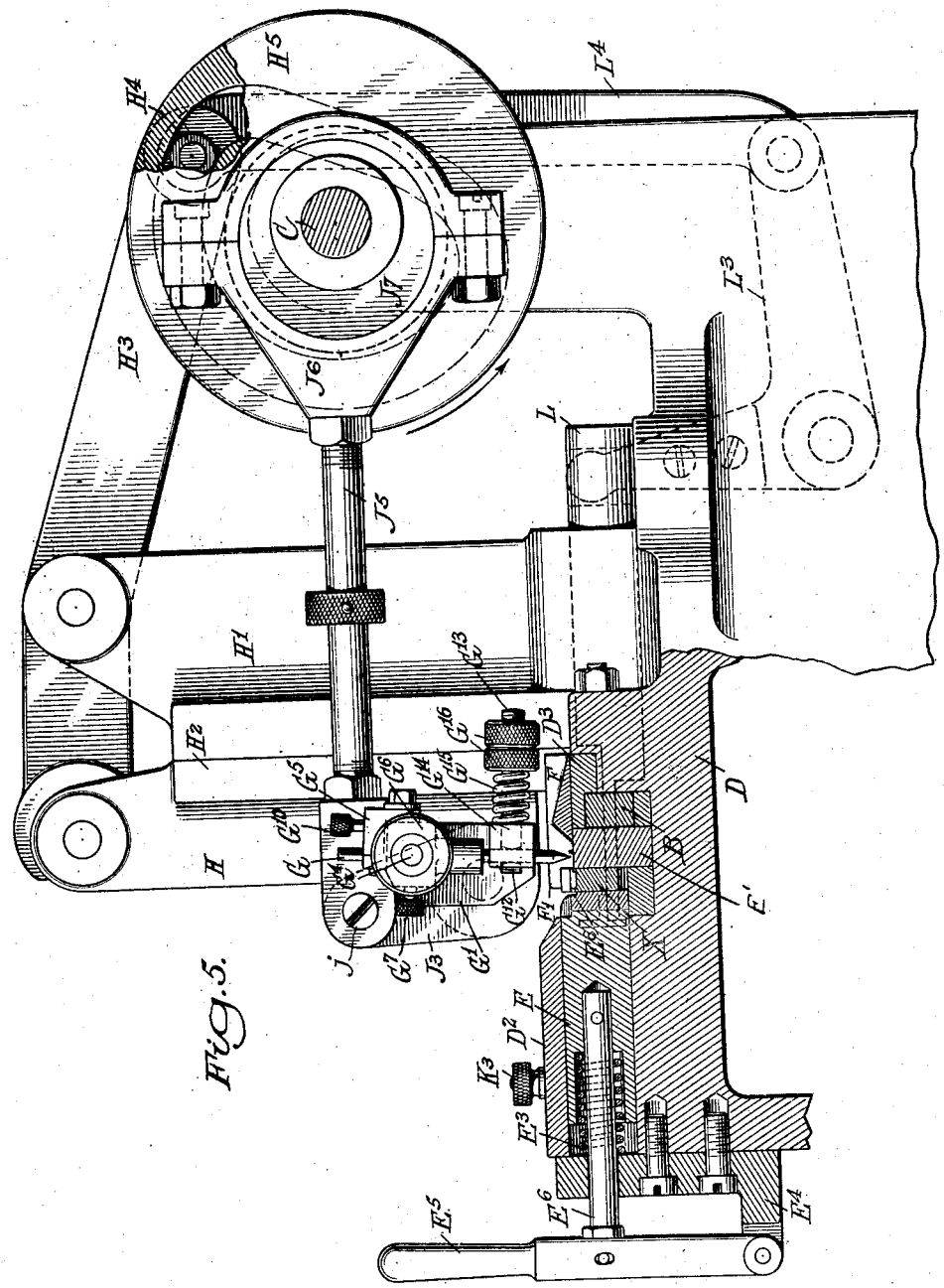
INVENTOR
Henry R. Hochuli
BY
ATTORNEYS May 3, 1927.
H. R. HOCHULI
MACHINE FOR CLEARING MATRIX CAVITIES
Filed Aug. 20, 1924
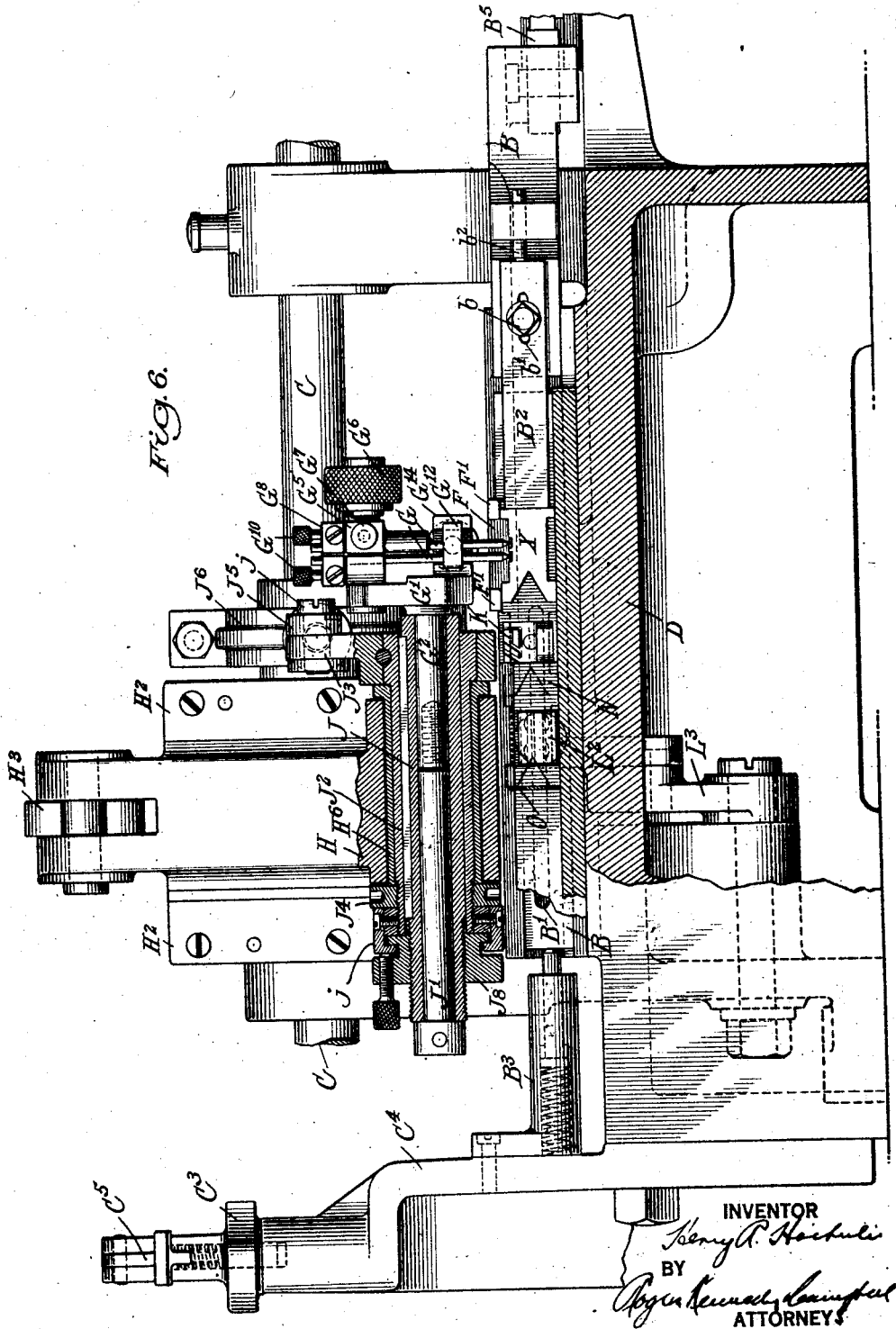

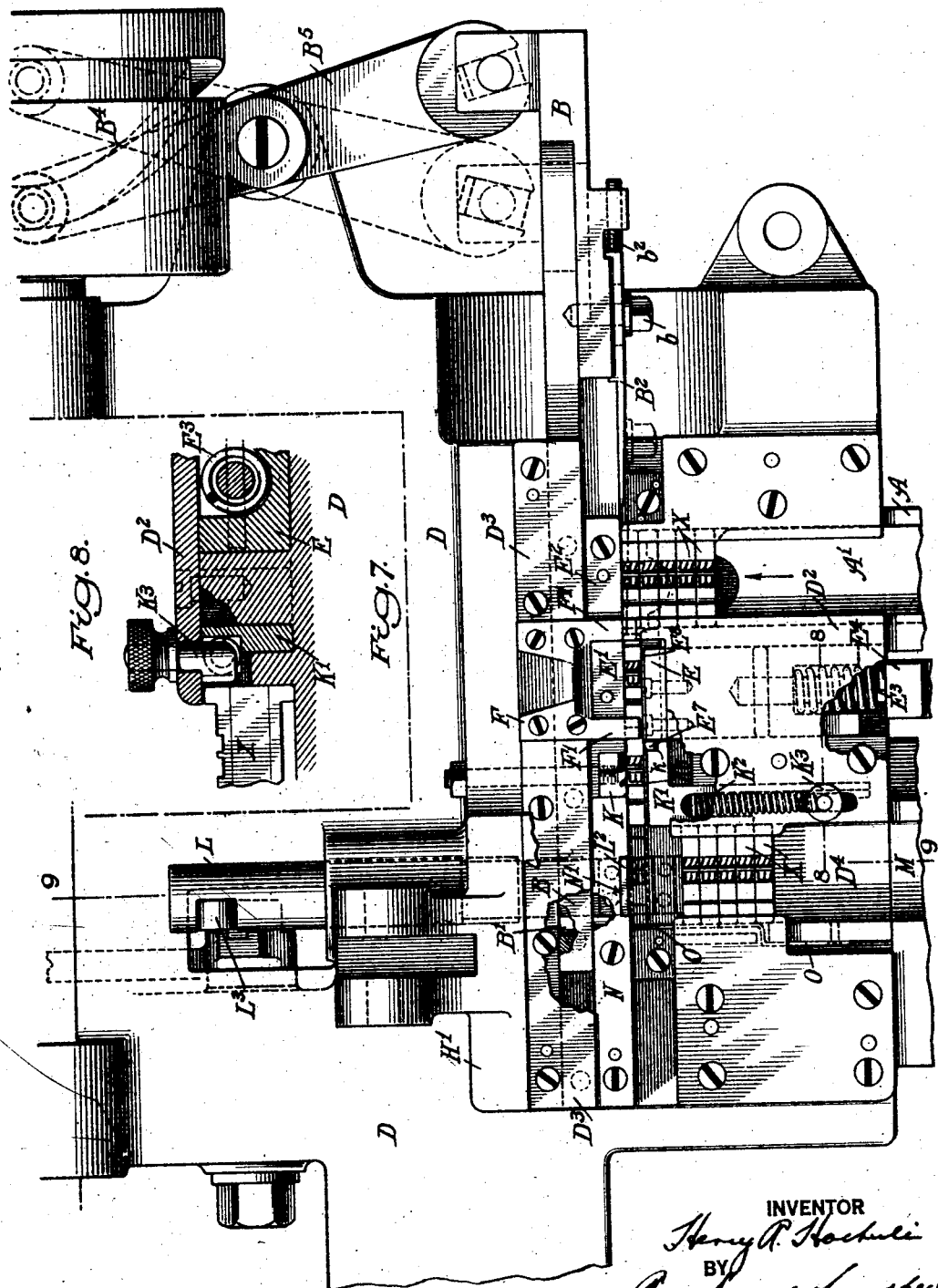

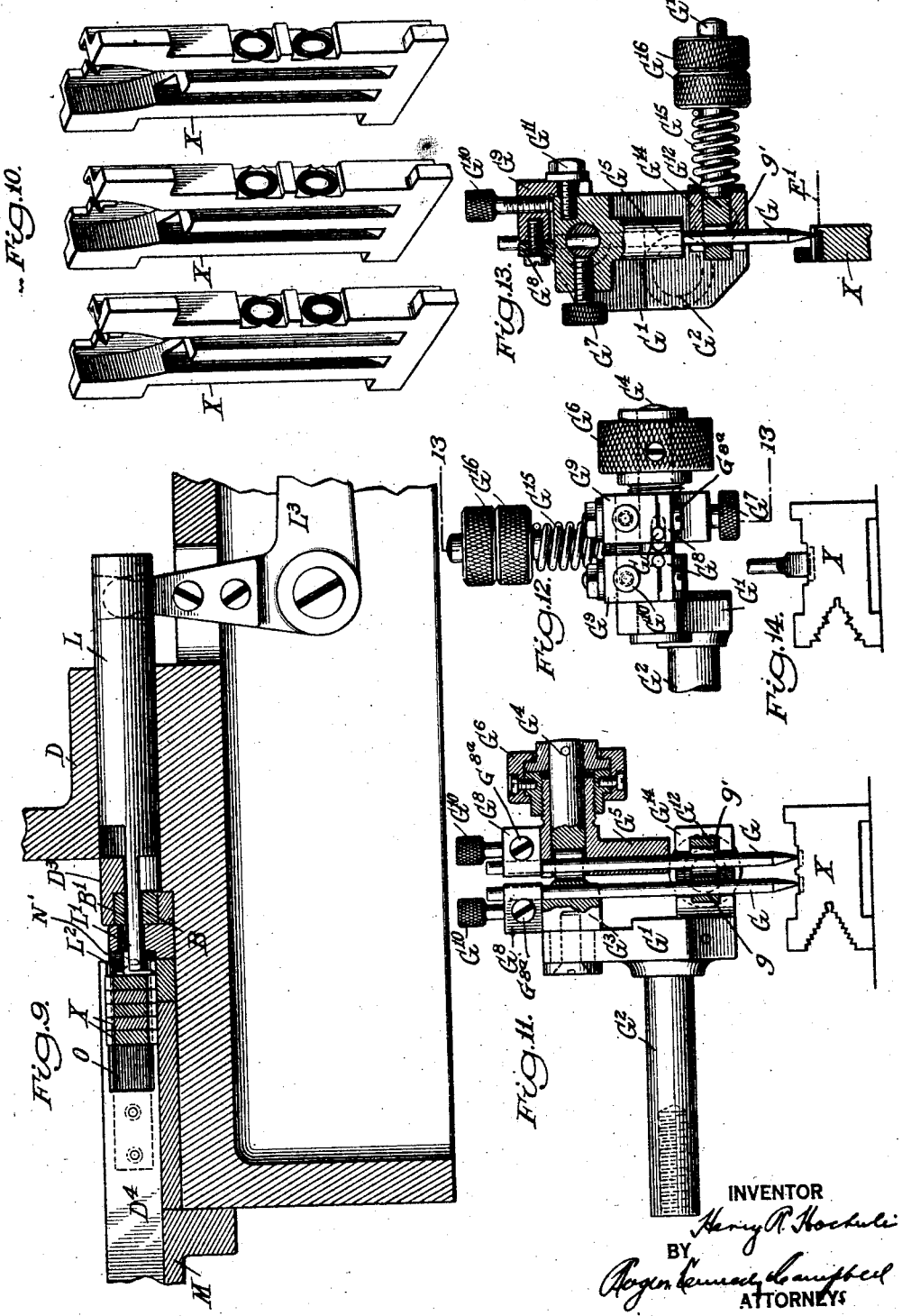

Patented May 3, 1927.

1,627,093

UNITED STATES PATENT OFFICE.

HENRY R. HOCHULI, OF JAMAICA, NEW YORK, ASSIGNOR TO MERGENTHALER LINOTYPE COMPANY, A CORPORATION OF NEW YORK.

MACHINE FOR CLEARING MATRIX CAVITIES.

Application filed August 20, 1924. Serial No. 733,111.

This invention relates to means for removing from the formative cavities of matrices, such as are employed in the commercial linotype machine, certain obstructions or imperfections which are frequently formed in the course of the production of the matrices. In the manufacture of linotype matrices, it is customary to first cut transverse "routing" notches in the casting edges of the matrix blanks and then punch the formative cavities or characters in the bottoms of said notches. The side faces of the matrices are then shaved to bring them down to the required thickness. During this latter operation, the relatively thin side walls of the wider matrix characters are frequently bent over or curled inwardly at the top so as to obstruct the cavities, and as a result, the printing faces of the type cast therefrom are liable to be defaced or destroyed. In the interest of type perfection, it is desirable that these obstructions be removed, and the custom heretofore has been to pick them out by hand, with the aid or employment of suitable tools. This practice, however, is slow, tedious and unsatisfactory, as well as very expensive, and the present invention contemplates a machine which will accomplish the same results automatically, thus facilitating the operation required for this work and reducing the cost in labor to a minimum.

In accordance with the present invention as embodied for example in the machine illustrated, the matrices whose cavities are obstructed in the manner stated, are presented to a picking tool and the parts are so mechanically manipulated as to cause the tool to enter the cavities and remove the obstructions. In the said machine, a magazine is provided in which the matrices to be operated on are stacked, and the matrices are removed one at a time from the leading end of the stack and delivered between holding jaws in position to be acted on by the picking tool, and on the completion of the picking operation, the matrices are dislodged from between the jaws and advanced past a trimming knife which acts to shave off any burs or projections produced by the action of the picking tool, and then the matrices are further advanced to the action of an ejecting mechanism which ejects them from the machine and stacks them in a suitable galley. It will be understood that in the foregoing operations, the matrices pass through the machine in procession, the matrices in advance being pushed by those following, and being subjected in succession to the action of the picking tool and trimming knife.

In the operation of the picking tool in one excursion of the matrices through the machine, only the obstructions at one side of the formative characters are removed, and in order to complete the operation and remove also the obstructions at the other side of the characters, it is necessary to send the matrices through the machine a second time, and in reversed position, to the end that the obstructions remaining will be presented in proper relation to the picking tool and trimming knife.

The detailed form and construction of the parts of the machine and their operative relations to bring about the above described results, will be fully described in the specification to follow, and the novel features of the invention set forth in the appended claims.

In the accompanying drawings:

Fig. 1 is a plan view of the improved machine;

Fig. 2 is a detail, showing the matrix feed device;

Figs. 3, 4 and 5 are side elevations of the machine, partly in section, showing successive positions of the picking tool during its action, and the corresponding positions of the correlative parts;

Fig. 6 is a vertical longitudinal section through the tool support and its operating head, and the underlying portion of the machine on which the matrices are supported, showing the matrix delivery slide advanced;

Fig. 7 is an enlarged plan view of a portion of the machine, showing the matrix delivery slide in its retracted position;

Fig. 8 is a sectional view on an enlarged scale of a detail, taken on the line 8—8 of Fig. 7;

Fig. 9 is a detail vertical section on the line 9—9 of Fig. 7, showing the matrix ejecting device;

Fig. 10 is a perspective view showing a matrix before and after the picking and trimming operations;

Fig. 11 is an elevation, partly in section, of the picking tool holder, showing the relation of the picking tools to the formative characters of a "two-letter" matrix;

Fig. 12 is a plan view of the tool holder;

Fig. 13 is a vertical section through the same on the line 13—13 of Fig. 12; and Fig. 14 is a detail, showing a modified form of picking tool used for larger or "head-letter" matrices.

Referring to the drawings:

A selection of matrices X whose cavities are to be cleared of obstructions, (those herein shown except in Fig. 14 being of the ordinary "two-letter" variety and of uniform thickness throughout) are stacked vertically on edge in a magazine A with their casting edges exposed and with the leading matrix of the stack located at the delivery end of the magazine in position to be removed therefrom. A suitable feed device is employed to advance the stack so that the matrices will be fed to the delivery position until the stack has been exhausted. Such device, in the present instance (see Fig. 2), comprises a follower block $A^1$ slidably mounted in the magazine and acted on by a suspended weight $A^2$, which tends constantly to urge the block against the stack and feed the same forward. A spring latch $A^3$ is pivoted to the block $A^1$ and is arranged to engage the forward edge of the magazine bottom plate and hold the block retracted to permit reloading of the magazine, when desired.

It is intended, as before stated, to remove the matrices from the magazine and deliver them successively to a "picking" position, where their cavities will be subjected to the action of the picking tools. The means herein employed for this purpose (see Figs. 1, 6 and 7) comprise an elongated reciprocating slide B, slotted at $B^1$ for the purpose presently to be described, and suitably guided in a guideway in the machine base frame D beneath a top guide plate $D^3$, and a finger $B^2$ carried by the slide and arranged in longitudinal alignment with the leading matrix in the magazine, said finger being adapted, during reciprocation of the slide, to push the matrix endwise to the "picking" position, where its two cavities will be properly aligned with the picking tools G later to be described in detail. In order that such position of the matrix may be accurately determined, the finger $B^2$ is connected to the slide so as to be capable of longitudinal adjustment with relation to the slide. In the present instance, this connection of the finger with the slide is effected by a clamping bolt $b$ which passes through a longitudinal slot $b'$ in the finger and is screwed into the slide, so that the finger can be held by the bolt in different relative positions longitudinally of the slide. A stop screw $b^2$ is mounted on the slide in rear of the finger in position to engage its rear end and thereby prevent its displacement from its adjusted position. A cushioning device $B^3$ in the form of a spring pressed plunger, is arranged to engage the extreme left hand end of the slide B (see Figs. 1 and 6), to take up any lost motion between the moving parts. Reciprocation is imparted to the slide B from a peripherally grooved rotary cam $B^4$ fixed to one end of a constantly operated drive shaft C journalled in suitable bearings at opposite ends of the base frame D. A pivoted lever $B^5$, carrying at one end a roller $B^6$ traveling in the cam groove, is pivoted at its other end to the matrix delivery slide B and constitutes the connecting element between said parts. Power is communicated to the shaft C through an ordinary spring clutch $C^1$ and a pair of variable speed drive pulleys $C^2$ arranged near the opposite end of the shaft, and a hand lever $C^3$, pivoted to a bracket $C^4$ and carrying a thumb latch $C^5$, serves to control the clutch and lock it out of action, as desired.

A pair of clamping jaws E, $E^1$ is employed for holding the matrices securely in the "picking" position, while they are subjected to the action of the picking tools. The jaw $E^1$ is stationary, being fastened down upon the base frame D and formed with an extension $E^2$, arranged across the delivery end of the magazine A. A stop is thus provided, against which the matrix stack is fed, and a continuous unbroken surface presented to the matrices as they are advanced to the "picking" position. The complementary jaw E, however, is slidably mounted in the base frame and held in place by a cover plate $D^2$, a helical spring $E^3$, arranged between the jaw and a fixed bracket $E^4$, serving to hold the former under the desired tension. In starting the operation of the machine, or when matrices thicker than those of the preceding selection are to be sent through the machine, the jaw E is manually retracted far enough to permit the insertion of a matrix of the selected thickness between the jaws. A hand lever $E^5$ is provided for the purpose, which is pivoted at its lower end to the bracket $E^4$ and is connected to the jaw through the medium of a rod $E^6$ (see Fig. 5). The purpose of this precaution may be readily understood, since, if the jaw were not retracted as described, a matrix during its advance from the delivery position, instead of dislodging the matrix between the jaws and pushing it ahead, as intended, would be stopped by contact with the jaw.

A matrix retaining plate F is secured to the top guide plate $D^3$ before alluded to and is formed with projecting fingers $F^1$, arranged to engage over the ears of the matrices when in "picking" position and to hold them against vertical displacement during the picking operation.

The picking tools, their mounting, and mode of operation will now be described, reference being had particularly to Figs. 11 to 14, inclusive. The tools G, a pair of which is ordinarily employed, are supported in a holder $G^1$ and are arranged to cooperate respectively with the two cavities of the matrices X as the latter are held between the clamping jaws. The tools used for these matrices have their active ends pointed, since the characters are small and the obstructions to be removed relatively so. However, it has been found advisable to use a tool of different form with a flat or chisel end such as that shown in Fig. 14, to cooperate with the larger or "head letter" matrices. These matrices usually have but a single character in their casting edges and one tool of the special form should be employed, instead of a pair. The holder $G^1$ is provided with a spindle $G^2$, projecting laterally therefrom, and which is rotatably mounted in a reciprocating head H suitably guided in a guideway in a standard $H^1$ rising from the base frame D. A tool supporting member $G^3$ is fixed to the upper end of the holder and extends therefrom in a direction opposite to the spindle $G^2$ and is formed with a machined shank $G^4$.

In order to secure desired flexibility in handling "two-letter" matrices of various sizes, provision has been made for adjusting the tools bodily to and from each other. To this end, one tool is anchored to the supporting member $G^3$, while the other is supported in an auxiliary carrier $G^5$, which is adjustably mounted on the shank portion $G^4$. A knurled nut $G^6$, mounted against axial movement on the shank $G^4$, is adapted, through its engagement with the threaded portion of the carrier $G^5$, to move the latter longitudinally on the shank and thereby effect the desired adjustment of the tool. A set screw $G^7$ is mounted in the carrier and binds against the shank $G^4$ and thus serves to hold the former in its adjusted position on the shank.

Means are also provided for individual adjustment of the tools toward and from the matrix cavities. Accordingly, the tools are respectively secured by suitable clamps $G^9$ in the form of angle blocks, one of which is supported directly upon the supporting member $G^3$ and the other by the auxiliary carrier $G^5$. Set screws $G^{10}$ and clamping screws $G^{11}$ are carried by the angle blocks and are engaged respectively with the supporting member and auxiliary carrier and serve to maintain the blocks and the tools clamped thereto in their adjusted positions, and clamping screws $G^{8a}$ extend through clamping plates $G^8$ on the blocks and are screwed into the blocks and serve to clamp the tools to the blocks. A yielding clamp block $G^{12}$ (see Fig. 13), is formed with a stem $G^{13}$ slidably mounted in an extension $G^{14}$ projecting laterally from the lower end of the supporting member $G^3$. This block is provided with two apertures $g$, $g'$ arranged to receive the respective tools, and when shifted to the right (Fig. 13), the rear walls of the apertures will engage the tools and will bind the latter against the extension, the aperture $g'$ being elongated to admit of the adjustment of the associated tool to and from the other tool by the nut $G^6$, as before described. A spring $G^{15}$ surrounds the stem $G^{13}$ and bears between the outer face of the extension and a nut $G^{16}$ on the stem and acts to hold the tools in yielding engagement with the extension. The tools are thus held normally disposed in the proper position to perform their function; at the same time however, the arrangement permits a relative rocking movement between the tools and holder about the axis of the member $G^3$, the reasons for which will hereinafter be pointed out.

In order that the picking operation be properly effected, it is preferable, according to the present invention, that the tools enter the matrix cavities in one direction and leave them in another direction in breaking away and removing the obstruction in the cavity. Means are therefore provided for imparting a compound motion to the tools. To this end, the head H, wherein as before mentioned the tool holder is journalled, is slidably mounted in the standard $H^1$ as before explained, and properly guided by the keeper plates $H^2$, $H^2$. A lever $H^3$ is pivoted between its ends to the standard $H^1$, and at its forward end to the upper end of head H, and extends rearwardly and carries at its rear end a roller $H^4$ traveling in the groove of the face cam $H^5$. This cam is keyed to the drive shaft C and the form of its groove is such that as the cam is rotated, a vertical reciprocating movement will be imparted to the tool holder, whereby the tools will be caused to enter the matrix cavities a certain distance at the limit of each down stroke of the head, such distance being of course determined by the individual vertical adjustment of the tools. The holder $G^1$ is rocked about the axis of its spindle $G^2$ so as to swing the tools, after they enter the matrix cavities, into contact with the obstructions therein and out through the side walls, whereby the obstruction will be broken away and removed. To effect this action, the holder is clamped to a sleeve J (see Fig. 6) by a bolt $J^1$, which enters the sleeve from its opposite end and has a threaded engagement with the holder spindle $G^2$. The sleeve J is keyed to a tube $J^2$, rotatably mounted in the head H and provided at one end with a crank arm $J^3$ and at its opposite end with a nut $J^4$, the latter serving to clamp the tube to the head bushing $H^6$. The arm $J^3$ is pivotally connected as at $j$ to one end of an adjustable link J⁵ (see Fig. 5), having at its opposite end an eccentric strap J⁶ mounted on an eccentric J⁷ on the drive shaft C and acting to impart the desired rocking motion to the tool holder transversely of the movements of the head H.

In order to prevent injury to the formative characters in the lateral movement of the tools due to the rocking of the tool holder, as just described, the upper face of the stationary clamping jaw E¹ (see Fig. 5) is disposed slightly above the bottom of the formative cavity, and yet sufficiently below the bottom of the routing notches to permit the removal of the obstructing portions of the side walls by the lateral movement of the tools. In other words the jaw E' is arranged free of, so as to expose, the upper portion of the side wall of the formative cavity, while bearing against and reinforcing the lower portion of said wall, so that the tool can break away the local obstruction in the cavity without danger of tearing away the entire wall and thereby mar the type face. Because of this condition, unless suitable provision were made, breakage of the tools, or damage to the operating parts would result during the lateral movement of the tools should they happen to be set a little too low, or should the side walls of the cavities be abnormally thick. This danger, however, is obviated by the pivotal mounting of the tool supporting member G³, which, together with the clamp block G¹², permits the tools to yield laterally with relation to the holder against the tension of the spring G¹⁵.

In order to admit of the adjustment of the picking tools lengthwise of the matrices, so that when the matrices are sent through the machine in reversed position, as before mentioned, the tools may be caused to occupy the proper position relative to the matrix cavities, the tool holder is mounted for horizontal adjustment in the head H independently of and relatively to the rocking means for the tool holder. As shown in Fig. 6, the sleeve J although keyed to the surrounding tube J² as before described, is capable of a limited movement lengthwise thereof, and an adjusting nut J⁸ is screwed on the threaded end of the sleeve J and is held against axial movement by the collar j, but is free to turn on the sleeve. By screwing up the nut or unscrewing the same, the sleeve will be fed endwise within the tube and relatively to and independent of the arm J³ by which the tube is rocked.

Burs, protruding from the side faces of the matrices, are frequently produced by the action of the picking tools, and should be removed in order to insure perfect alignment of the matrices when in use. A trimming knife K is therefore provided, which is counter-sunk in an extension of the stationary inactive jaw E¹ and is bolted into position, with its cutting edge flush with the inner face of said jaw. In order to facilitate the trimming action, a yielding block K¹ is arranged opposite the trimming knife and serves to press the matrix against the knife as the matrix is pushed by a succeeding matrix from its position between the clamping jaws E, E¹. This block is slidably mounted in the base frame D and recessed to receive a spring K², which is held under the desired tension by a regulating stud K³ adjustably fastened to the cover plate D² (Fig. 8). The block K¹ is thus yieldable or retractable independently of the movable clamping jaw E. This is of importance in that the clamping action of the jaw on a matrix will not be disturbed or affected in the event of the failure of the knife to properly remove the burs from a preceding matrix, since in such event, the camming back of the block by the protruding burs will be permitted by the yielding action of the block without affecting the position of the jaw. It is important, however, that the block be controlled as to its normal position by the position of the jaw, in order that when the jaw is set to accommodate a matrix of a given thickness, the block will be maintained in the proper position relatively to the knife to enable the matrix to be advanced between them and be properly operated on by the knife. This is effected by providing the jaw with a lug E⁷ projecting from the end thereof adjacent the block, which lug seats in an open notch k formed in the adjacent end of the block, the arrangement being such that when the jaw is retracted manually as before described by the lever E⁵ to give the jaw its initial set for the particular thickness of matrix to be operated on, the lug E⁷ will engage and retract the block to the same extent; yet by reason of the open character of the notch, the block is capable of a rearward movement when cammed back by burs which the knife fails to remove, independently of and without disturbing the action of the jaw in exerting its clamping action on the following matrix.

After the matrices have had their cavities cleared of obstructions at one side and the burs removed from the side face, they are advanced another step to the ejecting position, from which point they are pushed laterally or face-wise from the path of the succeeding matrices and stacked in a channel D⁴, a suitable galley M being arranged in communication therewith to receive the matrices from the chanel. A matrix ejecting mechanism is provided for this purpose and will now be described (see Figs. 7 and 9). This mechanism comprises a cylindrical slide L guided in the base frame D and a flat stem L¹ extending forwardly from the slide and provided on its extremity with a nose piece or pad L², which is adapted to engage the sides of the matrices when the latter are advanced to the ejecting position. The flat stem L¹ passes through the slot B¹ in the delivery slide before alluded to, and the ejector is reciprocated at right angles to the movement of the delivery slide, so that the matrices will be pushed sidewise in succession into the channel D⁴. The nose piece L² is adapted when the ejector is in a retracted position, to seat in a recess N¹, formed in a guide plate N, so as to be out of the way of a matrix as it is advanced from the trimming knives. Reciprocating motion is imparted to the ejector from the drive shaft C and face cam H⁵, before mentioned, a bell crank lever L³ being pivoted to the base frame and having one arm engaged with the cylindrical slide L and its other arm pivoted to one end of a link L⁴ whose opposite end is journalled on the axle of the roller H⁴ before alluded to as tracking in the groove of face cam H⁵, (see Fig. 5).

In order to prevent a matrix from being overthrown beyond the ejecting position, a stop O is provided, which is fastened to the left side wall of the channel D⁴, and serves to guide the matrix thereto as it is ejected. As shown in Figs. 7 and 9, this step is preferably of a yielding nature, so as to eliminate the possibility of damage to the parts, which might otherwise result from chips or similar obstructions lodging between the matrices or in the path thereof.

The general operation of the parts and the sequence in which the matrices are handled will now be clear. Assuming the parts to be in the position shown in Fig. 7, with a matrix between the clamping jaws E and E¹ and the head H raised, as shown in Fig. 3, it will be noted that the leading matrix of those stacked in the magazine is directly behind the one between the jaws and the delivery slide finger B² in longitudinal alignment with both. Hence, as the slide is shifted to the dotted line position (Fig. 7), a matrix will be removed from the magazine and presented between the matrix jaws, with its two cavities exposed to the picking tools G; at the same time, the next matrix in advance will be dislodged from between the jaws and advanced to the trimming knife K. The head H immediately descends under control of the face cam H⁵ to the limit of its down-stroke, and the picking operation is effected in the manner before described; i. e., by a partial rotation of the tool holder G¹ and the consequent swinging of the tools through the side walls of the matrix cavities, thereby breaking away and removing the obstructions. As the delivery finger B² is withdrawn to its retracted position, another matrix will be fed to the delivery position and, as it is presented between the jaws, the two matrices ahead will be pushed respectively to the trimming knife and the ejecting position. Thus, through the reciprocating action of the delivery slide, the matrices are removed from the magazine and advanced successively, step by step, along the inner face of the stationary jaw E¹, first to the "picking" position, where they are subjected to the action of the picking tools, then to the trimming knife which removes the burs from their side faces, and finally to the ejecting position, where they are stacked for removal, the operation of the parts being such that the ejector will stack a matrix in the channel D⁴ and recede before the succeeding matrix is advanced to the ejecting position.

As before stated, in carrying out the present invention, the matrices, after having been sent through the machine, are reversed end for end and sent through again, so that the opposite side walls of their cavities will be located in position to undergo the action of the picking tools, it being understood that the obstructions are formed in both side walls of the matrix cavities and not confined to one. The machine parts are therefore constructed so that the matrices will be properly handled in such reversed position, the only precaution necessary to observe before the matrices are sent through the second time, being a horizontal adjustment of the tool holder such as hereinbefore described as effected by the nut J⁸, to bring the tools into proper alignment with the cavities of a reversed matrix. In other words, the matrix cavities (see Fig. 10) are not arranged symmetrically or equi-distant from the opposite ends of the matrices, and consequently, when the matrices are sent through the machine the second time, their cavities will not occupy the same vertical planes as on their previous excursion so that the tool holder must be adjusted accordingly.

If, for reasons before mentioned, the burs produced by the picking tools are not removed, when the matrices are first sent through the machine, they would interfere with the functions of the clamping jaw E and slide block K¹, when sent through the second time and would prevent a matrix from being properly sustained in the "picking" positions and in proper relation to the trimming knife. The jaw E and block K¹ are therefore formed with longitudinal recesses E⁸ and K⁸ respectively in their clamping faces to provide the necessary clearance space for the burs.

In the accompanying drawings, the machine has been shown only in preferred form and by way of example, and obviously many modifications and changes therein will readily suggest themselves to those skilled in the art without departure from the scope of the invention. Thus, while the picking tools have herein been illustrated as operating automatically, they might just as well be mounted in a stationary holder, and the matrix support be the relative moving element instead of the tools, so long as the latter are caused to enter the formative matrix cavities for the purpose set forth. Also, a single tool, with a pair of picking end portions, might be employed advantageously, particularly if one of said portions were made adjustable with relation to the other. In short, it is to be understood that the invention is not to be limited to any specific form or embodiment, except in so far as such limitations are specified in the claims.

What I claim is:

1. In a machine of the class described, the combination of a matrix support adapted to sustain a matrix with its cavity exposed, a picking tool sustained relatively to the support to act in the matrix cavity to remove obstructions therefrom, and means for imparting a relative movement between said support and tool and operatively connected to one of said parts to cause the tool to enter the matrix cavity in one direction and remove the obstruction by movement in a different direction.

2. In a machine of the class described, the combination of a matrix support adapted to sustain a matrix with its cavity exposed, a picking tool sustained relatively to the support to act in the matrix cavity to remove obstructions therefrom, and means operatively connected with the picking tool and operable to cause the tool to enter the matrix cavity in one direction and leave the same in a different direction in removing the obstructions therefrom.

3. In a machine of the class described, the combination of a matrix support adapted to sustain a matrix with its cavity exposed, a picking tool sustained relatively to the support to act in the matrix cavity to remove obstructions therefrom, and means operatively connected with said tool to impart thereto reciprocating and oscillating motions respectively in different relative directions during each cycle of operation of the tool.

4. In a machine of the class described, the combination of means for supporting a matrix with its cavity exposed, a picking tool adapted to operate in said cavity to remove obstructions therefrom, a holder for said tool, a head in which the tool holder is pivotally mounted, means for reciprocating the head, and means for rocking the holder about its pivotal axis in the head.

5. In a machine of the class described, the combination of a pair of matrix clamping jaws adapted to sustain a matrix with its cavity exposed, a matrix picking tool sustained relatively to said jaws to act in the cavity to remove obstructions therefrom, means operatively connected with said tool to cause it to perform its function, and means operating in coordination with said tool for delivering matrices successively between the clamping jaws.

6. In a machine of the class described, the combination of a matrix support, a picking tool for removing obstruction from the matrix cavities, a holder for the picking tool, a reciprocating head, a tube journalled therein and supporting the tool holder, and means for imparting a compound motion to said tool, such means comprising a drive shaft, a face cam mounted thereon, a lever operated by said cam and connected to the head, an eccentric mounted on the drive shaft, and a link journalled on the eccentric and operatively connected to the said tube.

7. In a machine of the class described, the combination of a matrix support adapted to sustain a matrix with its cavity exposed, a picking tool sustained relatively to the support to act in the matrix cavity to remove obstructions therefrom, means operatively connected with the tool for causing it to perform its function in removing said obstructions, and means for adjusting the tool relatively to its operating means for proper cooperation with matrices of different sizes.

8. In a machine of the class described, the combination of a matrix support, a picking tool for removing obstructions from the cavities of the matrices sustained by said support, a holder for the picking tool, a reciprocating head in which the holder is rockably mounted, a rotary driving means, operative connections between the driving means and head to reciprocate the latter, and operative connections between the driving means and tool holder to rock the latter on the head, said connections being coordinated with each other to impart to the picking tool a compound movement to remove obstruction from the matrix cavities.

9. In a machine of the class described, the combination of a picking tool, a holder therefor, a head in which the holder is mounted, means for operating the head, and means for adjusting the holder relatively to the head so as to locate the picking tool in the desired operative plane.

10. In a machine of the class described, the combination of a tool holder, a pair of matrix picking tools carried by the holder, means for supporting the holder to cause the picking tools to enter the matrix cavities and remove obstructions therefrom, and means for effecting relative adjustment of the tools in the holder to and from each other.

11. In a machine of the class described, the combination of a matrix support adapted to sustain a matrix with its cavity exposed, a tool holder, a matrix picking tool carried by the holder and adjustable relatively thereto to and from the support, and means operatively connected with the tool holder for operating the same.

12. In a machine of the class described, the combination of means for supporting matrices with the formative cavities exposed, a tool holder, a picking tool carried by the holder, and means for operating the holder to cause the tool to perform its picking operations in removing obstructions from the matrix cavities, said tool being yieldable relatively to the holder in the direction of its picking action.

13. In a machine of the class described, the combination of a matrix support, a tool holder, operating means therefor, a picking tool carried by the holder, and a spring to permit yielding of the tool under certain abnormal conditions, as described.

14. In a machine of the class described, the combination of a tool holder, a pair of matrix picking tools carried by the holder, and means for adjusting one of said tools bodily with relation to the other.

15. In a machine of the class described, the combination of a tool holder, a tool supporting member journalled in said holder, a matrix picking tool mounted in the supporting member, and a yielding clamp block for holding the tool properly in its normal operative position.

16. In a machine of the class described, the combination of a matrix support, a tool holder, a tool supporting member journalled in said holder, a pair of picking tools, one of which is carried by said member, and an auxiliary tool carrier sustaining the other tool and adjustable longitudinally of said member so as to change the bodily relation of the tools, as desired.

17. In a machine of the class described, the combination of a matrix support, a tool holder, operating means therefor, a tool supporting member journalled in the holder, a picking tool mounted in said supporting member, an auxiliary tool carrier slidably mounted on said member, a second picking tool mounted on said carrier, means for adjusting the carrier longitudinally the supporting member, and a yielding clamp block for holding the tools disposed in their normal operative positions.

18. In a machine of the class described, the combination of a matrix support adapted to sustain a matrix with its cavity exposed, a picking tool sustained relatively to the support to enter the matrix cavity to remove obstructions therefrom, operating means acting on said tool to cause it to automatically perform its function, a matrix magazine for the matrices to be operated on, and a reciprocating slide for delivering the matrices successively from the magazine to the matrix support.

19. In a machine of the class described, the combination of a matrix support, an automatic picking tool for removing obstructions from the matrix cavities, a matrix magazine, a stationary matrix clamping jaw having an extension arranged across the delivery end of the magazine, a complementary spring actuated clamping jaw for holding a matrix up against the stationary jaw during the picking operation, means for feeding the matrices against the extension of the stationary jaw, and means for delivering the matrices successively from the magazine to "picking" position between the two jaws.

20. In a machine of the class described, the combination of an automatic matrix picking tool, a pair of jaws for holding the matrix during the picking operation, a matrix magazine, means for delivering the matrices successively from the magazine between said jaws, and a trimming knife operative upon a matrix after leaving the jaws for removing burs produced by the picking tool.

21. In a machine of the class described, the combination of an automatic matrix picking tool, a stationary matrix clamping jaw, a retractile spring actuated clamping jaw for holding a matrix up against the stationary jaw during the picking operation, a trimming knife, means for delivering the matrices from between said jaws across the edge of said knife, and a yielding block for pressing a matrix against the knife.

22. In a machine of the class described, the combination of a magazine for the storage of matrices to be acted on, a channel to receive the matrices from the magazine, a delivery slide movable lengthwise of said channel, means for advancing said slide to effect the delivery of the matrices from the magazine into the channel, and a spring acting constantly on said slide in opposition to its advancing movement.

23. In a machine of the class described, the combination of a fixed matrix clamping jaw, a cooperating retractable jaw, means for presenting matrices in succession between the jaws and for advancing the same beyond the jaws, a picking tool operative on the matrices held by the jaws to remove obstructions from the matrix cavities, a trimming knife in position to act on the matrices after leaving the jaws, a retractable block supported in position opposite the knife and cooperative therewith in holding the matrices up to the action of the knife, means for retracting the retractable jaw to accommodate thicker matrices, and means whereby the retraction of said jaw will correspondingly retract the block.

24. In a machine of the class described, the combination of a fixed clamping jaw, a cooperating retractable jaw, means for presenting matrices in succession between said jaws and for advancing them beyond the jaws, a picking tool operative on the matrices held by the clamping jaws to remove obstructions from the matrix cavities, a trimming knife to act on the matrices after leaving the jaws, a block supported opposite the knife and retractable independently of the retractable jaw, and means whereby the retraction of said jaw will correspondingly retract the block.

25. In a machine of the class described, the combination of a pair of clamping jaws for holding a matrix with its cavity exposed, a picking tool sustained relatively to the jaws to act in the matrix cavity to remove obstructions therefrom, a matrix magazine for the matrices to be operated on, means for delivering the matrices successively from the magazine to the clamping jaws, and an ejector adapted to engage the matrices after they are acted on by the picking tool and operable to stack said matrices.

26. In a machine of the class described, the combination of a matrix magazine, a pair of matrix clamping jaws, a trimming knife, an ejector, means for delivering the matrices successively to the clamping jaws, trimming knife and ejector, and a picking tool operating in coordination with the delivering means for automatically removing obstructions from the matrix cavities as they are presented between the jaws.

27. In a machine of the class described, the combination of an automatic matrix picking tool, a matrix magazine, a pair of jaws between which a matrix is clamped in the "picking" position, a reciprocating slide for delivering a matrix from the magazine between the jaws, a finger carried by the slide to directly engage the matrices, and means for adjusting the finger relatively to the slide in the direction of movement thereof; whereby the matrices may be properly presented in operative relation to the picking tool.

28. In a machine of the class described, the combination of an automatic matrix picking tool, a pair of matrix clamping jaws for holding a matrix in the picking position, a magazine in which the matrices are stacked, a trimming knife, an ejector for automatically stacking the matrices after they are trimmed, a reciprocating slide for removing the matrices from the magazine and delivering them successively to the "picking" position, the trimming knife and the ejector, and a cushioning device for said slide to function in the manner described.

29. In a machine of the class described, the combination of matrix supporting means, means for delivering matrices in succession endwise to said supporting means with the matrix cavities exposed and for advancing the matrices in succession beyond the supporting means, a picking tool for removing obstructions from the matrix cavities, means for operating said tool to cause it to enter the cavities of the supported matrices and to shift laterally thereof and remove the obstructions, and a matrix ejecting device operable on the matrices advanced beyond the supporting means and acting to stack said matrices facewise against each other.

30. In a machine of the class described, the combination of a matrix picking tool, a reciprocating head in which the tool is pivotally mounted, a matrix magazine wherein the matrices are stacked, a reciprocating slide for removing the matrices from the magazine and presenting them successively to the picking tool, a trimming knife, an ejector, and means whereby said head, picking tool, slide and ejector are operated in coordination with each other to handle the matrices in such sequence that their cavities will be first cleared of obstructions, their side faces freed of burs produced by the picking tool, and the matrices finally ejected and stacked.

31. In a machine of the class described, the combination of a matrix support adapted to sustain a matrix with its cavity exposed, a picking tool adapted to act in the matrix cavity to remove obstructions therefrom, and means for imparting a relative movement between said support and the tool and operatively connected to one of said parts, said means being operable to cause the tool to enter the cavity at the side of the obstruction and to break through the side wall of the cavity and thereby remove the obstruction.

32. In a machine of the class described, the combination of a matrix support adapted to sustain a matrix with its cavity exposed, a picking tool adapted to act in the matrix cavity to remove obstructions therefrom, means operatively connected with the tool and operable to move said tool into the matrix cavity at the side of the obstruction and then laterally through the side wall of the cavity to break away the obstruction.

33. In a machine of the class described, the combination of a matrix support adapted to sustain a matrix with its cavity exposed, a tool holder, a picking tool held fixedly in the holder and adapted to act in the matrix cavity to remove obstructions therefrom, and means for imparting a relative movement between said support and the tool holder, said means being operable to cause the tool to enter the cavity at the side of the obstruction and then to break through the side wall of the cavity and thereby remove the obstruction.

34. In a machine for removing obstructions from the formative cavities of matrices, the combination of matrix clamping jaws adapted to hold a matrix with its formative cavity exposed, one of said jaws extending above the bottom of the cavity so as to reinforce the lower portion of the cavity wall, and terminating below the upper end of the wall so as to expose the obstruction for removal, a picking tool adapted to act in the cavity on the exposed obstruction to remove the same, and means for imparting a relative movement between said jaws and the tool and operatively connected to one of said parts, said means being operable to cause the tool to enter the cavity at the side of the obstruction and to act on the obstruction above the jaw and thereby remove the same.

In testimony whereof, I have affixed my signature hereto.

HENRY R. HOCHULI.